3,326,633
PROCESS FOR REMOVING IMPURITIES FROM BY-PRODUCT GYPSUM

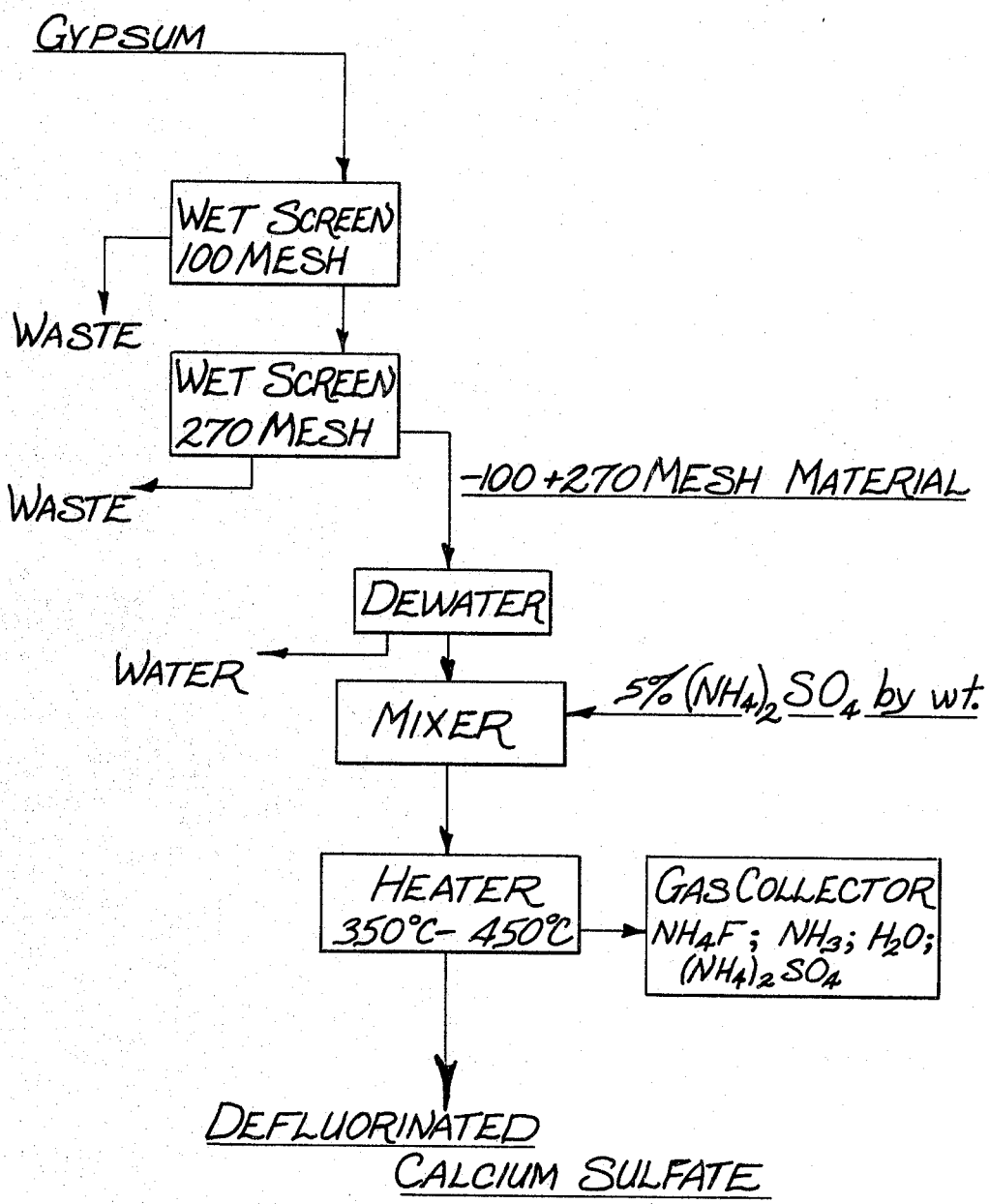

John N. Carothers and Rudolph J. Hurka, Jr., both of 1629 Lady Maria Lane NE., Atlanta, Ga. 30309
Filed May 22, 1963, Ser. No. 282,508
5 Claims. (Cl. 23—122)

This invention relates to a process for the treatment of by-product gypsum obtained when phosphate rock is reacted with sulfuric acid for the production of wet-process phosphoric acid. By means of our process fluorine is recovered and calcium sulfate, substantially free of fluorine, is obtained which is suitable as a source of calcium for industrial uses.

The principal objects of this invention are:

(1) The removal of impurities contained in by-product gypsum so that the calcium content and the sulfate content of the gypsum may subsequently be converted into valuable products.

(2) The removal of fluorine from by-product gypsum by a process whereby the gypsum so produced may be used as a source of calcium for the production of substantially fluorine free calcium phosphates.

(3) The removal of fluorine from by-product gypsum with the simultaneous dehydration of the gypsum.

(4) The recovery of fluorine from by-product gypsum.

Gypsum obtained in the production of phosphoric acid by the wet process, contains a certain amount of unreacted phosphate rock, slimes, organic material and from 0.2% to 0.5% fluorine. As is well known in the art to which our invention relates, such gypsum has heretofore been considered a waste product, without value and constituting a nuisance. The removal of the fluorine from the gypsum has heretofore been considered difficult, and its presence rendered the gypsum unsuitable as a source of calcium for various industrial uses.

We have discovered that the fluorine content of by-product gypsum obtained in the production of wet-process phosphoric acid may be readily removed and recovered by the process hereinafter described, and that some of the reagents employed can be recovered substantially completely.

In accordance with our invention, we heat an intimate mixture of fluorine-containing by-product gypsum and ammonium sulfate at a temperature of 350° C. to 450° C. Somewhat higher temperatures may be employed, but are not essential. Ammonia and fluorine containing compounds are driven off and may be readily collected. The fluorine compounds in the form of marketable products, may be separated from the accompanying ammonia by conventional methods. The ammonia separated from the fluorine compounds may be used for any desired purpose.

Referring to the accompanying drawing showing a flow sheet of a preferred method of carrying out our invention, we first prepare the by-product gypsum by removing coarse lumps and aggregates, and in doing this we have found that a 100 mesh screen is satisfactory for the removal of the oversize particles and aggregates which are then discarded. The material passing a 100 mesh screen is then further screened and washed to eliminate slimes and particles in the classification of ultrafines. It is preferable to remove this small size material by wet screening and washing rather than by chemical treatment. We have found that a 270 mesh screen is satisfactory for the removal of the small size material. In all screening operations, wet screening is preferred. The material passing the 270 mesh screen is discarded.

After the material is prepared as just described, the fraction retained on the 270 mesh screen is dewatered by any suitable means, for instance, by filtration. Ammonium sulfate, added to the dewatered gypsum prior to the heating step, may be added as an ammonium sulfate solution. A 10% to 15% ammonium sulfate solution is satisfactory for this purpose. The gypsum cake, wetted with ammonium sulfate solution, is then dried and any aggregates formed during drying are broken up so that the material will be of a size to pass a forty or fifty mesh screen. The dried gypsum cake, at this stage, contains about 5% ammonium sulfate, which amount is adequate for the elimination of the fluorine compounds in the heating step. Somewhat lesser or greater amounts may be employed.

An alternate means of adding ammonium sulfate to the moist dewatered gypsum is to mix solid ammonium sulfate in powdered form with the gypsum in such amount that the dry gypsum-ammonium sulfate mixture, prior to the heating step, contains approximately 5% ammonium sulfate by weight. The ammonium sulfate may also be added to the sized, dewatered, dried gypsum, and the two may be mixed by mechanical blending.

The gypsum cake, intimately mixed with ammonium sulfate as described, in amount to provide about 5% ammonium sulfate by weight, is then heated to a temperature in the range 350° C. to 450° C. Heating at this temperature for a period as short as one minute is sufficient to evolve substantially all of the fluorine. The material, after heating contains only from 0.05% to 0.07% F.

An illustration of the extent to which the fluorine content of the gypsum cake-ammonium sulfate mix is eliminated by means of our process is as follows: The sized, washed, dried gypsum prior to heating, had a fluorine content of 0.3%; after mixing with ammonium sulfate amounting to 5% of the weight of the mix, and heating at a temperature in the range 350–450° C. for a period of approximately one minute the fluorine content of the gypsum was lowered to 0.06%. By increasing the length of the period of heating a lower fluorine content may be obtained. The water content of the ammonium sulfate-gypsum mix is eliminated during the heating step along with the fluorine. The final product is substantially anhydrous calcium sulfate, substantially free of fluorine, and is suitable for use in the process of our copending application Ser. No. 229,268, filed Oct 3, 1962, (now Patent No. 3,246,948, dated Apr. 19, 1966), for the manufacture of a phosphatic animal feed supplement.

The fluorine compounds, ammonia, water, and such sulfates as are evolved in the heating step are collected and condensed in a suitable collector. Marketable fluorine products may be recovered from the condensate by well known methods. The ammonium sulfate collected may be recycled to the process, and the ammonia may be converted to ammonium sulfate by suitable methods and returned to the process.

We wish it to be understood that we do not desire to be limited to the exact details of the process herein described, for obvious modifications will occur to a person skilled in the art.

What we claim is:

1. Process for treating by-product gypsum to remove fluorine and produce substantially fluorine free anhydrous calcium sulfate which comprises
   (a) sizing the gypsum to remove coarse lumps, aggregates and slimes,
   (b) intimately mixing ammonium sulfate with the sized gypsum, in an amount approximately 5% of the weight of the mix,
   (c) heating the mixed gypsum and ammonium sulfate at a temperature of at least 350° C. to drive out fluorine compounds and ammonia from the mix, and
   (d) collecting the evolved fluorides and ammonia.

2. Process defined in claim 1, in which the gypsum and ammonium sulfate mix is heated at a temperature of 350° C. to 450° C.

3. The process defined in claim 1 in which the ammonium sulfate in the form of a 10% to 15% solution is mixed with the gypsum.

4. The process defined in claim 1 in which the ammonium sulfate in powdered form is mixed with moist dewatered gypsum.

5. The process defined in claim 1 including
   (a) screening and washing the gypsum to remove coarse lumps, aggregates and slimes, and to separate out particles passing a 100 mesh screen and retained on a 270 mesh screen,
   (b) intimately mixing ammonium sulfate with the particles retained on the 270 mesh screen in an amount approximately 5% of the weight of the mix,
   (c) heating the mixed gypsum and ammonium sulfate at a temperature of from 350° C. to 450° C. for a period of at least one minute, and
   (d) collecting the evolved fluorides and ammonia.

References Cited
UNITED STATES PATENTS

| | | | |
|---|---|---|---|
| 2,747,963 | 5/1956 | Thomsen | 23—122 X |
| 3,181,985 | 5/1965 | Gates et al. | 23—122 X |

OSCAR R. VERTIZ, *Primary Examiner.*

E. C. THOMAS, M. WEISSMAN, *Assistant Examiners.*